FILTER HAVING PASSIVE RC STAGES AND ACTIVE INTERFACE NETWORKS

Filed March 16, 1967

INVENTOR
FRANK M. PERRA
BY Stevens, Davis, Miller & Mosher
ATTORNEYS

INVENTOR
FRANK M. PERRA
BY Stevens, Davis, Miller & Mosher
ATTORNEYS

INVENTOR
FRANK M. PERRA

BY Stevens, Davis, Miller & Mosher
ATTORNEYS

United States Patent Office 3,522,457
Patented Aug. 4, 1970

3,522,457
FILTER HAVING PASSIVE RC STAGES AND ACTIVE INTERFACE NETWORKS

Frank M. Perra, Laurel, Md., assignor to Halliburton Company, Duncan, Okla., a corporation of Delaware
Filed Mar. 16, 1967, Ser. No. 623,635
Int. Cl. H04b *1/10, 15/00;* H03f *3/18*
U.S. Cl. 307—295 7 Claims

ABSTRACT OF THE DISCLOSURE

An active filter including RC filter stages serially coupled by interface networks of double Darlington configuration and a positive Darlington feedback circuit feeding an adjustable signal to the preceding RC shunt component reference lead so as to provide a floating reference potential therefor.

BACKGROUND

The present invention relates to active filters and more particularly to high, low and bandpass filters having a plurality of RC filter stages coupled in signal series.

Conventional designs of RC filter circuits do not yield the acceptable result of achieving a 3 db attenuation level at normalized frequency of one. Consequently, it has been the practice in the past to use LC filters in order to obtain the desired selectivity. However, filters employing this technique suffer from the disadvantages of being physically large and, because of the Q-requirements, imparting signal degradation in the low frequency ranges.

The invention avoids the problems mentioned above by providing a high pass, low pass, bandpass filter, including cascaded RC stages with active interface networks coupled in the signal series path and having a positive feedback path providing an adjustable floating reference potential to the shunt components of the immediately preceding RC stage. Each RC stage and interface network can be adjusted to impart near zero attenuation at near zero degrees phase shift at the selected frequency with a uniform and sharp rolloff characteristic by virtue of the circuit design.

Another feature of the invention is the input impedance matching network and the interface network design which inherently compensates for power supply fluctuations. The matching network comprises a pair of cascaded Darlington circuits having complementary type transistors. Each interface network comprises a similar arrangement with the positive feedback taken from the junction of the two Darlington circuits and coupled via another Darlington circuit back to the floating reference terminal of the RC filter stage shunt components. The amounts of static and dynamic feedback are adjustable by means of voltage dividers at the input of the feedback Darlington circuit. The resistor and capacitor values of the RC stages are adjustable so as to render the filter circuit more versatile permitting the operator to select the desired frequency.

It is therefore an object of the present invention to provide an active filter which can function as a high pass, low pass or bandpass filter wherein rolloff, attenuation and phase characteristics of the filter are improved over a wide operating frequency range by means of interface networks coupled in the signal series path between RC filter stages feeding a positive feedback signal to the reference side of the RC filter shunt components.

Other and further objects of the invention will become apparent with the following detailed description when taken in view of the appended drawings in which.

DETAILED DESCRIPTION

Figures 1, 2A, 2B:
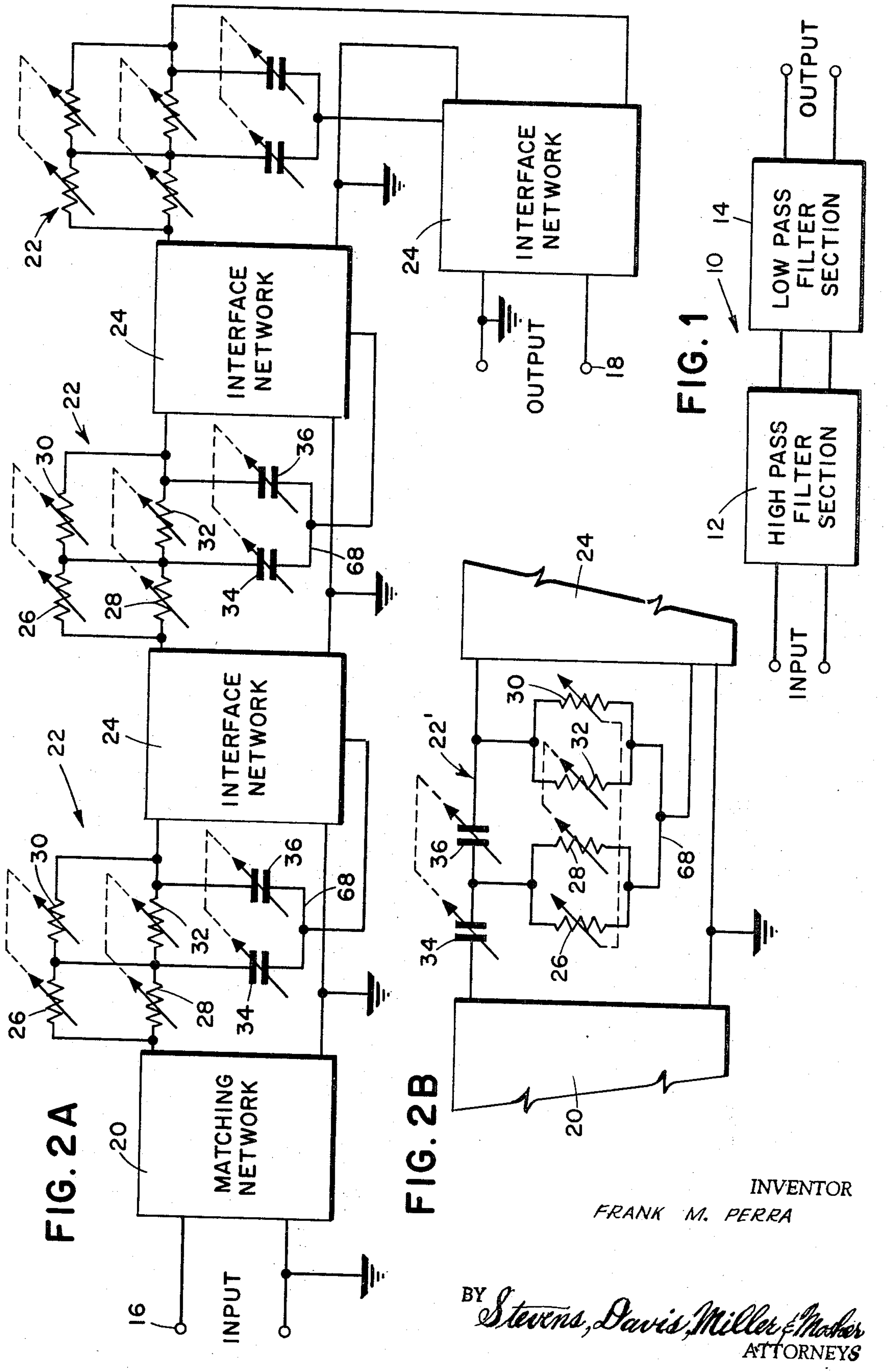
FIG. 1 is a block diagram of a bandpass filter including a high pass filter section and a low pass filter section, each section being designed in accordance with the present invention.
FIG. 2A is a diagrammatic illustration of the low pass filter section of FIG. 1.
FIG. 2B is a schematic diagram of one of the RC stages switched or connected to provide a high pass filter function.

The active filter incorporating the invention and generally indicated as 10 includes a pair of cascaded independent filter sections 12 and 14. Each filter section can be adjusted to function as a low pass or high pass filter over a frequency range of, for example, 0.1 Hz. to 500 kHz. By cascading the filter sections, filter 10 can provide a high pass, low pass, or bandpass function depending upon the settings of the sections. In FIG. 1, the sections are set to provide a bandpass function for filter 10.

Each filter section comprises a pair of input terminals 16 and a pair of output terminals 18, an input impedance matching network 20 and a plurality, in this example, three RC filter stages 22 coupled in a signal series configuration by an equal number of interface networks 24 providing positive feedback to the preceding RC filter stage and impedance matching therefor as more fully described below.

The dual function (high or low pass) of each filter section may be effected by a switching arrangement (not shown) controlled by the operator which reverses the relative positions of the resistors and capacitors in each RC filter stage 22. For example, in FIG. 2A section 14 is arranged to provide a low pass filter function by virtue of the series resistance and shunt capacitance arrangement of the RC components; however, by switching the relative positions of the components as shown in FIG. 2B, the filter section provides a high pass function.

In order to improve the rolloff characteristics of each filter section, each filter stage 22 includes a pair of cascaded RC networks so as to increase the slope of the attenuation curve. In addition, positive feedback signals are coupled from the associated interface network to the reference terminal 68 of the shunt components in order to achieve controllable variation of the slope of the attenuation curve in the cutoff region. For normal operation, it is preferred that the feedback be adjusted to provide 3 db of attenuation at the cutoff frequency, however, for special application, the feedback can be internally adjusted in a manner described below to effect more or less than 3 db of attenuation at this frequency.

Each RC stage 22 includes parallel resistors 26 and 28 in series with parallel resistors 30 and 32. Resistors 26 and 30 are variable but are at all times equal to each other as are resistors 28 and 32. The shunt capacitors 34 and 36, directed in L-configurations with the resistors to form cascaded RC pairs are also at all times equal and variable in ganged relation. Each of the resistors 26, 28, 30, 32 and capacitors 34 and 36 may be formed of a plurality of individual components of different values which are selectively and individually switched into the circuit design as illustrated.

Figure 3:
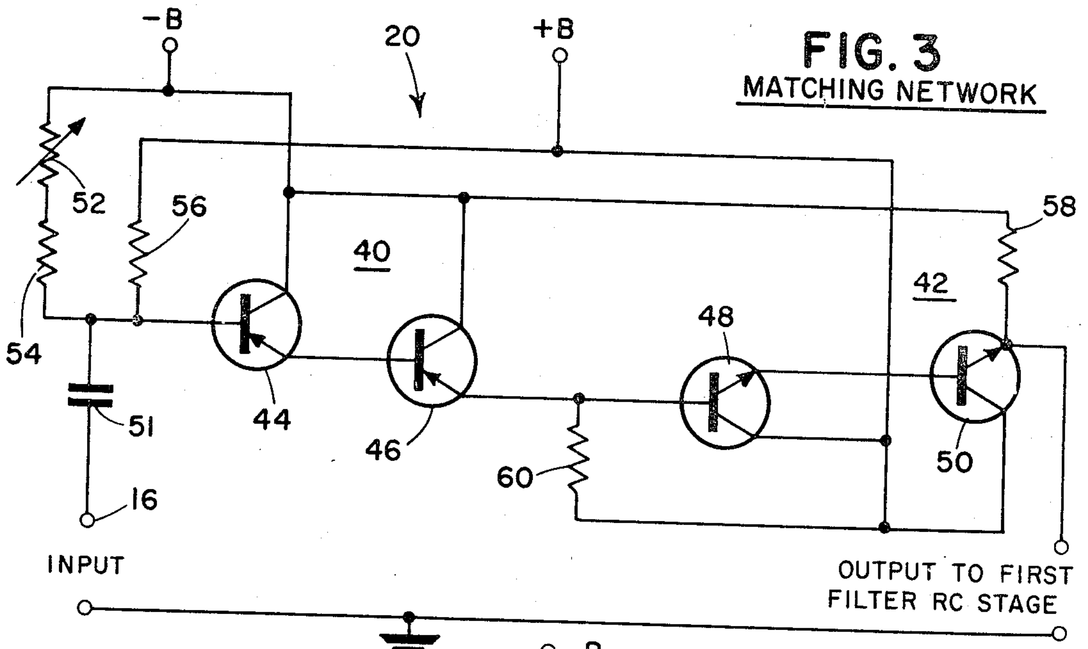
FIG. 3 is a schematic diagram of the matching network of FIG. 2.

Matching network 20 at the input of each filter section, as illustrated in FIG. 3, provides impedance matching between the input to the filter section and the first RC filter stage 22. The matching network comprises a pair of cascaded Darlington circuits 40 and 42 each comprising a pair of transistors 44, 46, and 48, 50 of complementary conductivity types. Power (+ and —B) is supplied preferably by batteries so as to avoid power line fluctuations. The input to the matching network 20 is connected through a coupling capacitor 51 to the base of transistor 44. The value of capacitor 51 should be large enough to cause less than 3 db of attenuation at 0.1 Hz. The B— supply is coupled through a variable bias resistor 52 in series with resistor 54 to the base of transistor 44, and the B+ power supply is also connected through a bias resistor 56 to the same electrode.

Initial DC biasing is provided by resistors 52 and 54 and 56 connected generally as shown, resistor 52 being adjustable to obtain exact DC bias adjustment.

The output for the matching network is taken from the emitter of the last transistor 50 which is connected through load resistor 58 to the minus power supply. The collectors of transistors 48 and 50 are connected back through an emitter resistor 60 to the direct and common connection between the output emitter of transistor 46 and the control electrode or base of transistor 48.

The matching network 20 has a characteristic of multiplying the input impedance by virtue of the cascaded Darlington circuits which impedance is proportional to beta squared (beta being the current gain of each transistor 44 and 46) times the emitter resistance 60. In one example, an input impedance of greater than 2 megohms was obtained with an output impedance of 3 ohms.

Furthermore, because of the equal and opposite changes in conduction of circuits 40 and 42, network 20 provides a common mode rejection function as well as the offset function as described. Because the output impedance of 3 ohms is negligible with respect to the input impedance of the next RC filter stage 22, matching network 20 affords the desired input and output impedance magnitudes without introducing error in the time constant of the RC stage.

Another advantage afforded by circuit matching network 20 is that it introduces a negligible change in the DC level between input and output leads. This is accomplished by using complementary transistors in the two cascaded direct coupled Darlington circuits. Particularly, transistors 44 and 46 are NPN transistors so that the DC drop between the base and emitter of transistors 44 and 46 is compensated by the voltage rise between the base and emitter of transistors 48 and 50.

Any suitable type transistor can be used in the Darlington circuits; however, silicon transistors are preferred because of their low cost and desirable impedance characteristics.

The output of the matching network 20 feeds the input terminal of the first RC filter stage as described, and because of the two cascaded RC networks, each stage 22 can yield, for example, an attenuation rate of 12 db per octave which in turn provides an attenuation rate of 36 db per octave for the filter section as a whole.

Figure 4:
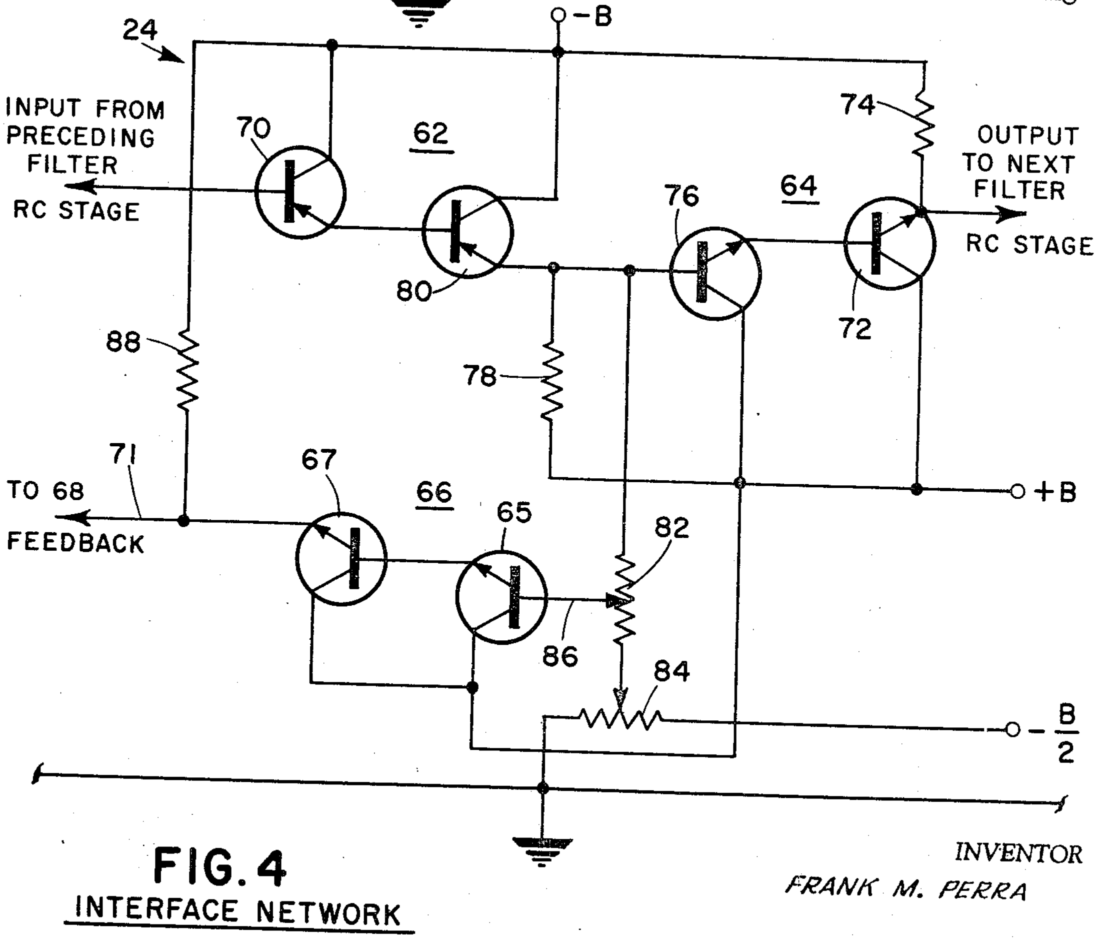
FIG. 4 is a schematic diagram of one of the identical interface networks of FIG. 2.

The output of each filter stage 22 is fed to an interface network 24 illustrated in detail in FIG. 4. Interface network 24 also includes a pair of cascaded Darlington circuits 62 and 64 having complementary transistors and connected in the series signal path. Operational characteristics of circuits 62 and 64 are the same as described above for the matching network 20. A further Darlington circuit 66 provides positive feedback from the interconnection of circuits 62 and 64 back to the common reference terminal 68 of the shunt components for the preceding filter stage 22.

The input to the interface network 24 is fed directly to the base of the first transistor 70 and the output is taken at the emitter of the last transistor 72 connected to load resistor 74. As in the matching network 20, the collectors of transistors 72 and 76 are connected together and coupled through an emitter resistor 78 to the common junction of the transistor 80 emitter and the base of transistor 76. The dynamic signal component fed through Darlington circuit 62 is impressed across variable voltage dividing resistors 82 and (part of) 84. It is preferred that resistor 82 approximate 10 times the value of resistor 84 so that dynamic feedback is dependent substantially entirely upon the setting of the adjustable tap 86. In this way, part of the dynamic signal component is fed through Darlington circuit 66, which is of the same transistor conductivity type as Darlington circuit 64, to the floating reference terminal 68 as described above. In this way common mode rejection and variable offset is achived by Darlington circuits 62 and 66. An emitter resistor 88 serves as a load resistor for Darlington circuit 66.

Another negative power source having a voltage value, for example, one-half that of B— is coupled through resistor 84 to ground so as to supply primary bias to circuit 66. When the filter section is operated in the high pass mode, the DC voltage on the feedback lead 71 is coupled to the base of transistor 70 through the last resistor in the preceding RC stage 22 in order to bias circuit 62. The tap on potentiometer 84 is adjusted to bias transistor 70 at a suitable level. When the filter section operates in the low pass mode, bias is coupled to the base of transistor 70 by the RC stage series resistors which are in turn coupled to the appropriate power supply of the preceding interface network 24 or matching network 20.

In operation, when the transistors in Darlington circuits 62 are driven toward greater conduction, the current through resistor 78 increases thus biasing the transistors in Darlington circuit 64 toward nonconduction in which case the current through output resistor 74 is reduced causing the output signal to follow the input signal. In this way, there is ideally a 0° phase shift between input and output signals of interface circuits 24. As described in connection with network 20, the DC voltage drop imparted by Darlington circuit 62 is compensated by the DC voltage rise of Darlington circuit 64 so that the total input and output DC levels always remain the same. Similar DC compensation takes place through Darlington circuit 66 in the feedback loop. Common mode rejection is also provided as described.

Figure 5:
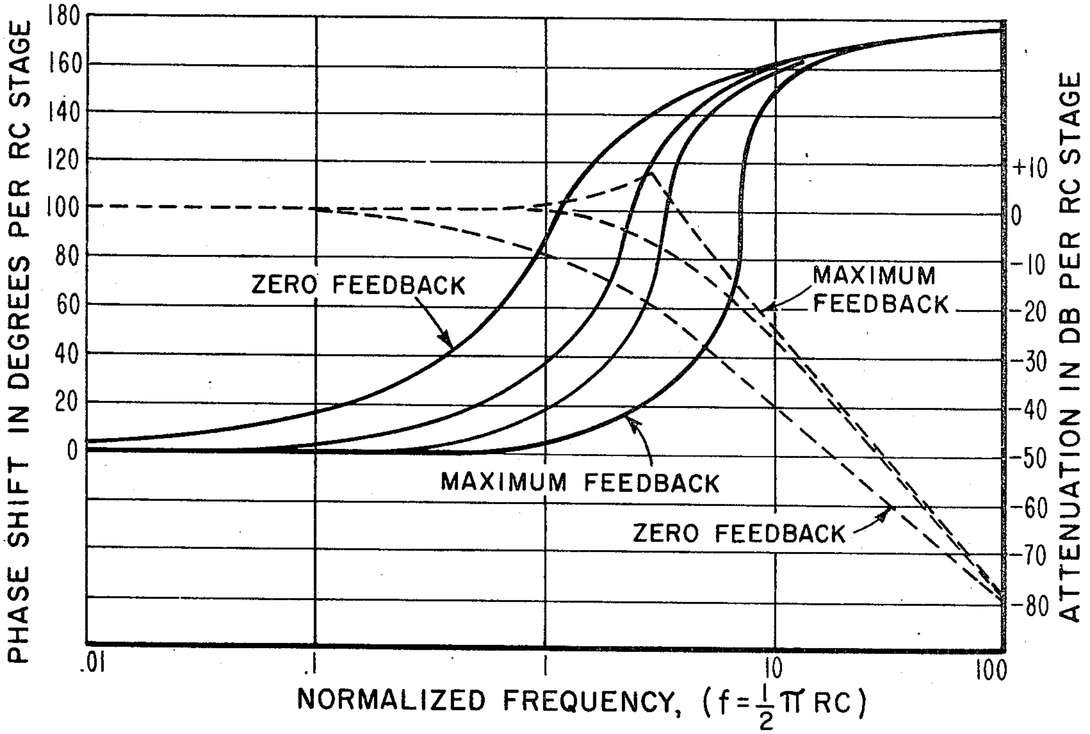
FIG. 5 represents the attenuation and phase curves of each RC stage of the low pass filter section of FIG. 2A.

With reference to FIG. 5, the effectiveness of the active filter incorporating the invention can be seen. Without feedback, each RC stage imparts about 10 db attenuation and roughly 90° phase shift to the signal in the vicinity of normalized frequency equal to one. However, by varying the amounts of feedback, the phase and attenuation characteristic curves can be improved to 0 db attenuation with a little as 5° phase shift at a normalized frequency of one. With maximum feedback, the signal is slightly amplified near and above the unity normalized frequency.

Figure 6:
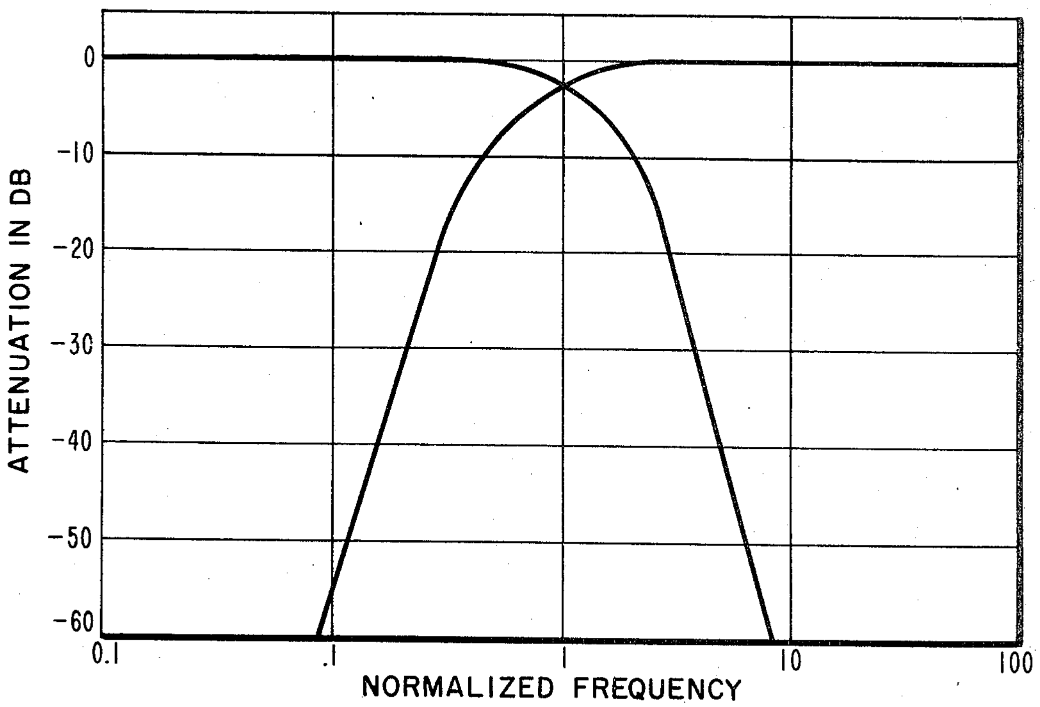
FIG. 6 represents the rolloff characteristics of each filter section of FIG. 1.

The attenuation curves in FIG. 6 show the linear rolloff characteristics of each filter section of the bandpass filter 10. Since each RC filter stage 22 imparts to the signal 12 db per octave attenuation, each filter section as a whole provides 36 db per octave. It will be appreciated that the bandwidth of filter 10 is adjustable.

One example of the invention comprises a circuit design with the following components.

Power supply B ____________6 volts.
Transistors:
44, 46, 70, 80 __________2N3643.
48, 50, 76, 72, 65, 67 ____2N3638.
Resistors:
26, 30 ________________360 ohms to 3.6K.
28, 32 ________________3.6K to 36K.
52 ____________________100K (max.).
54 ____________________150K.
56 ____________________150K.
58 ____________________1.0K.
60 ____________________6.2K.

Resistors:—Continued

| | |
|---|---|
| 74 | 1.0K. |
| 78 | 6.2K. |
| 82 | 10.0K. |
| 84 | 1.0K. |
| 88 | 1.0K. |
| Capacitors: | |
| 51 | 25 microfarads. |
| 34, 36 | .0044–44.0 microfarads. |

Various modifications can be made to the herein disclosed example of the present invention without departing from the spirit and scope thereof.

What is claimed is:

1. An active filter comprising at least one RC stage arranged to provide one of a high pass and low pass function and having two shunt elements, one end of each shunt element connected to the series signal path and the other ends thereof connected to a common reference terminal, and active interface circuit receiving the signal from each stage and producing an interface circuit output signal as well as a positive feedback signal, said feedback signal coupled to the common reference terminal of the RC stage shunt elements so as to provide a floating reference potential therefor, wherein said interface circuit includes input and output cascaded amplifiers, said output amplifier producing the interface circuit output signal generally in phase with the signal arriving at the input amplifier, said input and output amplifiers having opposite effects on the DC level change in the signal series path so that the DC level at the interface circuit output follows that at the interface circuit input, wherein said input and output amplifiers are directly coupled and each comprises transistors of corresponding conductivity type arranged in a Darlington configuration, the transistors of said input and output amplifiers being of complementary conductivity types, and further comprising a feedback amplifier having transistors of a conductivity type corresponding to that of said output amplifier and arranged in a Darlington configuration.

2. A filter as set forth in claim 1, wherein said interface circuit includes means for varying the amplitude of the feedback signal.

3. A filter as set forth in claim 1, wherein the feedback amplifier of the interface circuit for producing the positive feedback signal includes means for varying the amplitude of the feedback signal, which means is coupled from the input and output amplifier intercoupling to the input of said feedback amplifier.

4. A filter as set forth in claim 1, wherein an impedance matching network is coupled to feed the input of the first RC stage, said network comprising a pair of direct coupled Darlington circuits in series with the signal path, each Darlington circuit having a pair of corresponding conductivity type transistors which are of a type complementary to the type of the other Darlington circuit.

5. A filter as set forth in claim 1, wherein at least two such RC stages and associated interface circuits are provided, arranged with the output of one interface circuit feeding the next RC stage, said at least two RC stages being arranged to provide the same of one of a high and low pass function.

6. A filter as set forth in claim 1, wherein a high pass section is formed of at least two such RC stages and associated interface circuits arranged with the output of one interface circuit feeding the next RC stage input, each of said at least two RC stages providing a high pass function, and a low pass section is formed of at least two such RC stages and associated interface circuits arranged with the output of one interface circuit feeding the next RC stage input, each of the last mentioned at least two RC stages providing a low pass function, and said high and low pass sections being in signal series to provide a bandpass function.

7. A filter as set forth in claim 1, wherein means providing a variable bias voltage is coupled to the input of said feedback amplifier.

References Cited

UNITED STATES PATENTS

| | | | |
|---|---|---|---|
| 2,987,678 | 6/1961 | Miller et al. | 330—109 |
| 3,296,546 | 1/1967 | Schneider | 330—21 |
| 3,361,991 | 1/1968 | Wyndrum | 331—142 X |
| 3,384,844 | 5/1968 | Meacham | 307—315 X |

OTHER REFERENCES

"Variable Filter Tunes to 1 Megahertz," Electronics, July 11, 1966, p. 145.

STANLEY D. MILLER, Acting Primary Examiner

U.S. Cl. X.R.

307—233, 315; 328—167; 330—17, 26, 31; 333—76, 80